Dec. 17, 1935.　　　　H. L. WAISNER　　　　2,024,671
PROPELLER SHAFT

Original Filed March 20, 1930　　3 Sheets-Sheet 1

Inventor:
Horace L. Waisner
By
Wilson, Dowell, McCanna & Rehm
Attys.

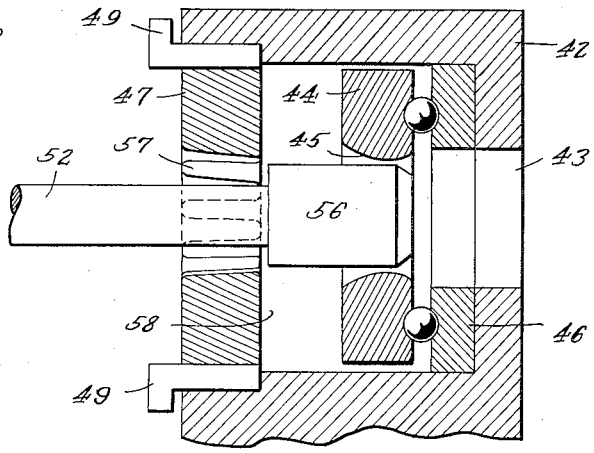
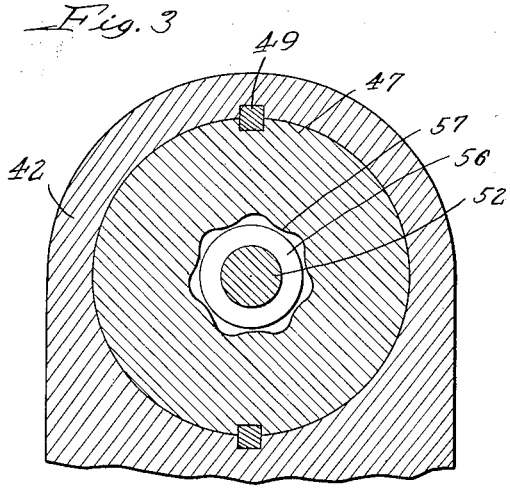
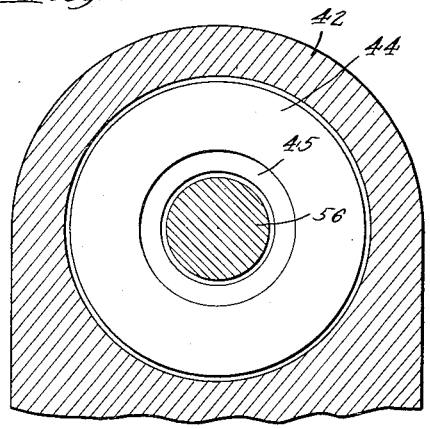
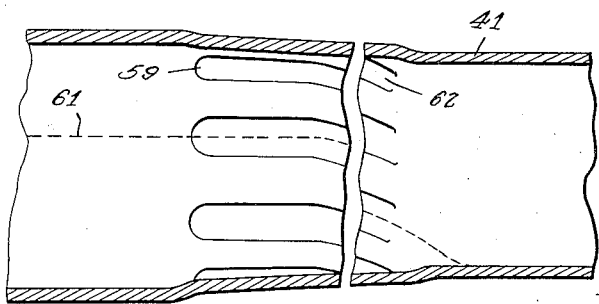

Dec. 17, 1935.    H. L. WAISNER    2,024,671
PROPELLER SHAFT
Original Filed March 20, 1930    3 Sheets—Sheet 3
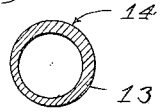    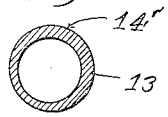
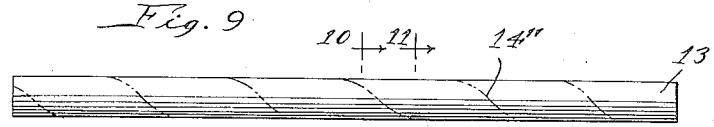
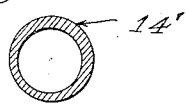    
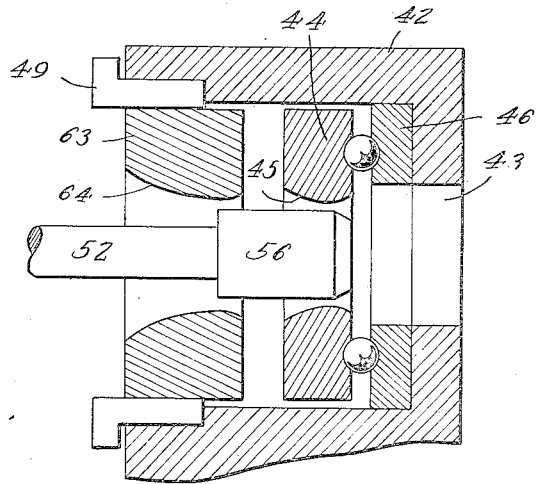

Patented Dec. 17, 1935

2,024,671

UNITED STATES PATENT OFFICE 2,024,671

PROPELLER SHAFT

Horace L. Waisner, Rockford, Ill., assignor, by mesne assignments, to Borg-Warner Corporation, Chicago, Ill., a corporation of Illinois Original application March 20, 1930, Serial No. 437,354, now Patent No. 1,967,487. Divided and this application October 26, 1931, Serial No. 571,593

2 Claims. (Cl. 64—1)

My invention relates to seamless metal tubing for propeller shafts and has special reference to propeller shafts wherein the inequalities in wall thickness are arranged helically along the wall of the tube, whereby improved static and dynamic balance is imparted thereto.

In the production of seamless metal tubes, the wall along one side of the tube is invariably thicker than the other, thus causing the center of gravity of the tube to fail to coincide with the geometric center of the outer surface thereof. When such tubes are mounted as propeller shafts considerable vibration develops as a result of their rotation at high speeds. These vibration difficulties increase as the rate of rotation of the shaft increases. As the trend in automobile construction moves toward vehicles of greater speed, it becomes increasingly important to have propeller shafts of greater dynamic balance. This I have accomplished by twisting the tube between its ends, to helically arrange the opposing heavy and light walls of the tube along its length. In this manner, the heavy wall is arranged to lie in substantially equal proportions on all sides of the tube, materially improving the dynamic balance thereof.

A further source of difficulty with tubes of this character is that the mandrel marks lie parallel to the fiber of the metal which often results in materially reducing the strength of the tube. The older methods of forming the tube almost invariably cause decarbonization of the inner surface, further reducing the strength thereof.

One of the objects of the invention is the provision of a propeller shaft having the inequalities in wall thickness arranged helically along the walls of the tube to improve the dynamic balance thereof and increase its strength.

I have also aimed to provide a seamless propeller shaft wherein the mandrel marks lie at an angle with respect to the fiber of the metal.

Other objects and attendant advantages will become apparent to those skilled in the art from the following description and the accompanying drawings in which—

Fig. 2 is an enlarged view of the holding and drawing dies;

Fig. 3 is a section on the line 3—3 of Fig. 1 through the holding die;

Fig. 4 is a section on the line 4—4 of Fig. 1 showing the rotating die;

Fig. 5 is a section through the tube where it passes through the dies;

Fig. 6 is a perspective view of a tube showing in dotted lines the center of the heavy side thereof;

Figure 1:
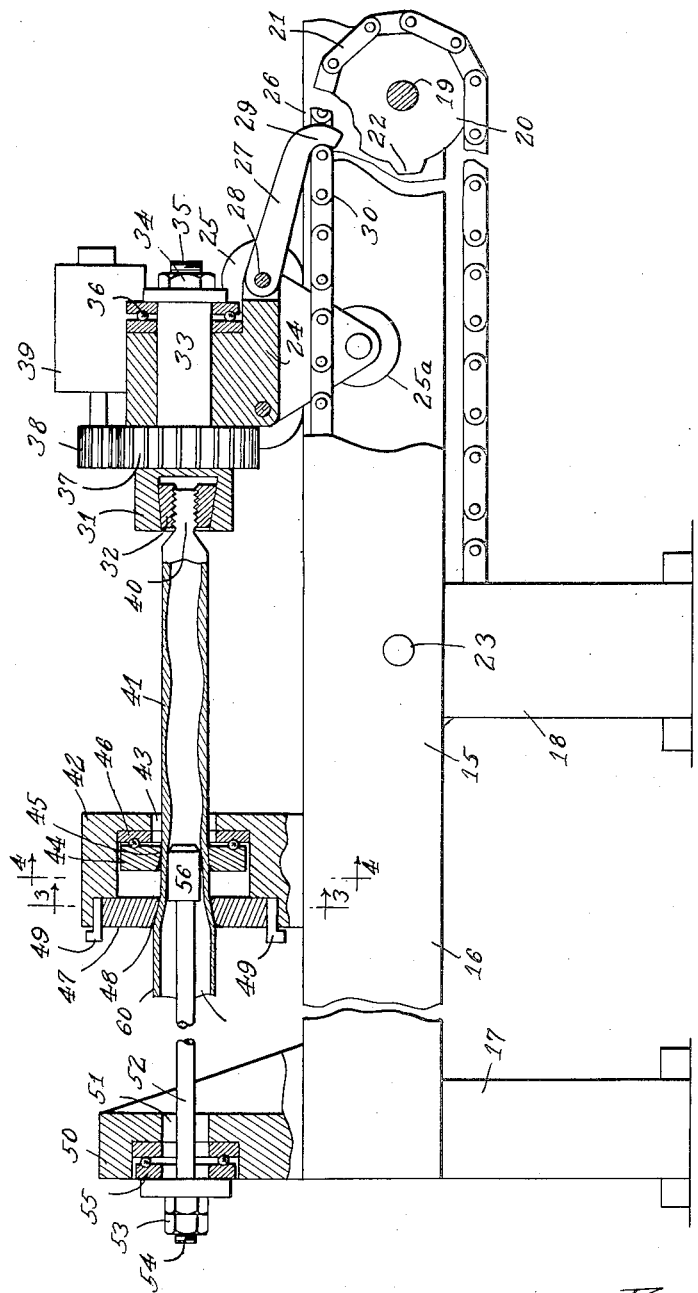
Figure 1 is an elevation partly in section showing the complete assembly for drawing and twisting the tube.

Figs. 7 and 8 are sections on the lines 7—7 and 8—8 of Fig. 6 showing the manner in which the heavy section of the wall lies along one side of the tube;

Fig. 9 shows the manner in which the heavy side of the wall of the tube shown in Fig. 6 would be arranged if manufactured by my improved method;

Figs. 10 and 11 are sections on the lines 10—10 and 11—11 of Fig. 9 also showing the manner in which the heavy side of the wall is directed helically along the wall of the tube by my improved method; and Fig. 12 is a section through a second holding die which may be employed for the second pass of the tube through the drawing mechanism.

The invention contemplates in a general way the provision of a propeller shaft formed by twisting a seamless tubular metal blank to arrange any inequalities in wall thickness helically along the walls of the tube and to draw the tubular blank to a desired size in such a manner as to cause the mandrel marks to lie at an angle with respect to the fiber of the metal. Referring to Figs. 6–11, inclusive, the numeral 13 designates a tube as formed in the usual manner having a thickened side 14', the center of which is designated by the numeral 14. Figs. 7 and 8 show the manner in which this thickened portion 14' lies substantially lengthwise of the tube. Fig. 9 shows the manner in which the thickened portion of the tube, as indicated by the line 14'', will be helically disposed along the walls of the tube when the tube is prepared according to my invention. Figs. 10 and 11 show the manner in which the thickened portion 14' is disposed around the center of the tube.

While the invention is not strictly limited to propeller shafts of seamless tubes it will doubtless be found to be of the greatest advantage in connection with this type. Though the discussion is directed particularly to steel tubes, the invention is generally applicable to tubes of any metal having sufficient strength to be useable for this purpose.

This is a division of my copending application, Serial No. 437,354, filed March 20, 1930, which resulted in Patent #1,967,487.

Directing attention first to a satisfactory manner of forming the propeller shafts, a tubular blank is first formed according to the well known methods for producing seamless tubing. This tubular blank is then subjected to a twisting step wherein the walls of the tube are directed circumferentially, the result being that the inequalities in wall thickness which, prior to the twisting step lie parallel to the axis of the outer surface of the tube, are directed in the form of a helix along the walls of the tube. This step contemplates a rotative movement about the longitudinal axis of the tube axially, the full cross-section of metal being displaced and the opposing inner and outer surfaces of the tube passing through a corresponding and identical movement. This movement is in contradistinction to a movement in which the opposing inner and outer surfaces of the tube have a movement with respect to each other. A movement such as I obtain will cause the thicker wall portion of the tube to project in the form of a helix on the surfaces of the tube. The tube is then passed through a reducing die or dies wherein the tube is reduced to a desired diameter. The drawing operation also causes the irregularities in wall thickness to project from the inner surface of the tube and causes the outer surface to be truly cylindrical. These two steps may be carried on separately or simultaneously as desired. A suitable machine adapted to carry out these steps in a simultaneous manner is shown in Fig. 1, but it will be understood that the method and apparatus are herein disclosed merely by way of illustrating one way in which the shaft may be satisfactorily formed and I do not intend to limit the scope of the invention to shafts made by any particular method or apparatus.

Referring to the drawings, Fig. 1 shows a conventional tube drawing bench, designated generally by the numeral 15, having a horizontal bed 16 and suitable legs 17 and 18 for supporting the bench. A driven shaft 19 serves to support a sprocket gear 20 having an endless driving chain 21 trained thereover. Cogs 22 on the sprocket 20 engage the chain 21 and act to move the latter with the shaft 19. A second sprocket, not shown, is supported upon a shaft 23 and serves to support the opposite end of the endless chain 21. A chuck carriage 24 is supported on the upper side of the bench 15 through a plurality of wheels 25 which rest upon the upper edges 26 of the bench 15 and a wheel 25a therebeneath. The chuck carriage is adapted to move from end to end of the bench upon the wheels 25. A draft arm 27 is pivotally supported upon the axle 28 of the rear wheels 25 and is provided at its outer end with the hooks 29 adapted in its lower position to engage with links 30 of the chain 21. When so engaged movement of the chain 21 to the right, facing Fig. 1, serves to move the chuck carriage 24 toward the right end of the bench 15. Suitable means such as wheel 25a may be provided for maintaining the chuck carriage 24 in firm contact with the upper edge 26 of the bench 15. A chuck 31 having jaws 32 therein is rotatably secured within the chuck carriage 24 upon a chuck shaft 33, through a nut 34 engaging a threaded end 35 thereof, the nut 34 bearing against a thrust bearing 36 which permits the shaft 33 to rotate with a minimum amount of friction. A gear 37 is fixedly positioned on the shaft 33 and is arranged to engage a gear 38 adapted to be driven by a motor 39. Thus, through the agency of the motor 39, the gears 38 and 37 are driven rotating the chuck 31 and jaws 32. Any suitable means may, however, be employed for rotating the chuck 31 in timed relation to the drawing movement as hereinafter described. The forward end 40 of a tube designated generally by 41 is engaged by the chuck jaws 32 in any suitable or desired manner so that rotation of the chuck 31 will cause rotation of the forward end 40 of the tube 41.

A die support 42 is suitably positioned upon the drawing bench 15 and is fixedly secured thereto. The forward end of the die support is provided with a central opening 43 through which the tube 41 is adapted to pass. The opening 43 should be considerably larger than the tube 41 so that there is no contact between the support 42 and the walls of the tube. A drawing die 44 is positioned within the die support 42 behind the opening 43 and is provided with suitable faces 45 to reduce the tube 41, through the drawing operation, to the desired size. A thrust bearing 46 is positioned between the die support 42 and the die 44 in such a manner as to permit free rotation of the die 44 against the pressure of the drawing operations. A holding die 47 is positioned near the rear end of the die support 42 and is provided with a centrally located, straight ribbed opening 48 through which the tube 41 is arranged to pass before entering the drawing die 44. The diameter of the tube is reduced to a certain extent within this holding die, though this is by no means essential, the primary object of the die being to prevent rotation of the tube 41 at this point. The die 47 is secured within the die support 42 by means of a plurality of keys 49 which prevent relative movement between the die support 42 and the die 47. The general shape and mounting of the dies 44 and 47 is shown more in detail in Figs. 2, 3, and 4 presently to be discussed.

A mandrel bracket 50 is fixedly secured to the drawing bench 15 and is provided with a suitable opening 51 within which is rotatably positioned a mandrel bar 52 through nuts 53 positioned upon a threaded end 54 of the mandrel bar 52. A thrust bearing 55 serves to permit the free rotation of the mandrel bar 52. The forward end of the mandrel bar 52 is provided with a mandrel 56 which is shown more in detail in Fig. 2. The mandrel bar 52 projects inside the tube 41 and supports the mandrel 56 within the drawing die 44, the mandrel 56 determining the inside diameter of the tube 41 after the drawing operations have been completed. The mandrel bar 52 should be suitably supported to permit a small amount of lateral movement for the mandrel 56 to accommodate the latter for the displacement of the thickened portions of the tube 41. The natural springiness of the mandrel bar will usually be sufficient to provide this lateral movement.

Referring to Figs. 2, 3 and 4, which show the two dies and the die supporting section, straight ribs 57 are shown on the surface of the holding die 47 and a space 58 is provided between the holding die and the drawing die 44. The mandrel 56 is so positioned that the forward end thereof will be within the drawing die 44 causing the metal of the tube 41 to be reduced to pass between the surfaces of the mandrel 56 and the drawing die 44.

In operation, the forward end 40 of the tube 41 is inserted through the dies 47 and 44 and grasped by the jaws 32 of the chuck 31, the carriage 24 being moved to the left to permit this. The draft arm 27 is then engaged with the links 30 of the chain 21 and the motor 39 is caused to rotate the chuck 31. The forward end of the tube 41 is, by this operation, drawn away from the die support 42 and at the same time is rotated. While the chuck 31 may be rotated in either direction if desired, I have found that it is preferable to turn the forward end 40 of the tube in a clockwise direction (viewed from the right hand end of the machine) when propeller shafts are being manufactured, since this gives the tube a right hand twist and permits the tube to subsequently be employed to better advantage as a propeller shaft wherein clockwise motion is being transmitted. As the forward end 40 of the tube 41 is drawn outward through the dies 47 and 44 the ribs 57 of the die 47 are pressed into the metal, as shown at 59 in Fig. 5. This prevents the rear end 60 of the tube 41 from rotating with the rotary motion of the front end of the tube. There must consequently be a twisting action somewhere between the holding die 47 and the forward end 40 of the tube. This twisting action falls in the space 58 between the holding die 47 and the drawing die 44 since the metal at this point is relatively soft as compared with the metal after it has passed through the drawing die 44. The drawing die 44 being rotatable on the thrust bearing 46, the rotation of the forward end 40 of the tube 41 is transmitted back into the space 58. The tube between the drawing die 44 and the forward end 40 thereof will be relatively hard as compared with the rear end 60 of the tube, due to the cold working operations performed upon it, while the metal in the space 58 will be of intermediate hardness, and certainly will be the softest portion of the tube between the die 47 and the forward end of the tube. The mandrel 56 is so arranged and positioned as to be rotatable with the drawing die 44 and with the movement of the forward end 40 of the tube. It is also of such size as to bear against the inner walls of the tube only within the drawing die 44. This leaves the metal in the space 58 free both on its outer and inner surface and, the metal being soft, the tube at this point is bent at an angle on the arc of the circumference, dependent upon the ratio between the linear movement of the chuck 31 and the rotary movement thereof. I have found it convenient to draw the tube through the dies at a linear speed of about 10 feet per minute and have provided one revolution of the chuck 31 to about twenty inches of such linear movement. By bringing the mandrel 56 into contact with the die 44 and permitting both of these to rotate with the rotation of the forward end 40 of the tube I provide a displacement of the metal within the walls of the tube which is different from that obtained by other methods. It will be plain that the inner and the outer surfaces of the tube 41 are maintained in fixed relation to each other by the mandrel 56 and the die 44. There is consequently no relative movement between these surfaces at this point. In like manner, the depressions 59 in the tube caused by the ribs 57 of the holding die prevents twisting movement of the metal within the die 47, consequently movement of the metal in the area 58 is substantially at right angles to the radius of the outer surface of the tube. This movement is shown by the dotted line 61 of Fig. 5 which is intended to indicate the direction of the fiber of the metal. The forward ends 62 of the depressions 59 are likewise deflected upon entering the area 58 as shown in Fig. 5. In this manner it will be seen that the fiber of the metal as well as the inequalities in thickness of the tube wall will be directed helically along the wall of the tube before the tube has been drawn through the drawing die 44. Movement between the tube 41 and the mandrel 56 is entirely linear since the mandrel is permitted to rotate with the rotation of the tube. For this reason the mandrel marks will not be formed on the inside of the tube in the form of a helix but will extend parallel to the length of the tube. Consequently, these mandrel marks will lie across the fiber of the metal at an angle and not lie parallel thereto, as is the case with other types of drawing operations.

Obviously, many changes may be made in the construction as shown. For example, the holding die 47 may be rotated instead of rotating the chuck 31. However, in that case the distance between the die 47 and the drawing die 44 should be relatively small to prevent buckling of the soft tube in the space 58. In like manner both the holding die 47 and the chuck 31 might be rotated in opposite directions thereby accomplishing the same results. The distance between the holding die 47 and the drawing die 44 is not particularly important so long as they are not positioned so closely together as to result in rupture of the metal. I have found that this distance should usually be not less than about one inch. Generally speaking, however, in steel tubes the higher the carbon content of the tube metal the greater the space 58 should be. However, the greater this space the more waste tube results from the drawing operations. It is, therefore, a compromise as to the proper distance between these two points, the distance depending upon the particular conditions under which the machine is being operated.

I have found that in the normal operation of the machine with low carbon steel for example of .08 to .12 C. the tube may be reduced, for example, from a diameter of 2½ inches at the rear end 60 to a diameter of two inches at the forward end of the tube by a single pass through the dies 47 and 44. The particular dies shown are so arranged that the holding die 47 reduces the diameter of the tube from 2½ inches to substantially 2⅛ inches while the drawing die 44 further reduces the diameter of the tube to two inches. However, when the tube is of high carbon steel it is often necessary to make more than a single pass of the tube through these dies. Under such circumstances the dies 47 and 44 are so arranged as to reduce the size of the tube, for example, from 2½ inches at the end 60 thereof to 2⅛ inches on the forward end of the tube. The tube is then annealed and treated in the usual manner for a second drawing operation. In this second drawing operation a smooth faced holding die 63, such as shown in Fig. 12, is employed. In this instance the face 64 of the die is made considerably longer to increase the friction between the tube 41 and the die and prevent rotation thereof. In this second pass of the metal through the dies the tube may be given a further amount of rotation if desired or may be drawn laterally through the dies without rotation. On this second pass through the dies the tube is reduced, for example, from 2⅛ inches to two inches in diameter, dies of suitable size being employed for the purpose.

The mandrel 56 is in contact with the inner wall of the tube 41 through only a small proportion of its length. This results in a minimum amount of rubbing between the two surfaces as a result of which substantially no decarbonization occurs on the inner surface of the tube 41.

By these drawing operations the physical properties of the tube are substantially increased and the tube may be made substantially lighter because of this increased strength. The fact that the mandrel marks lie at an angle with respect to the fiber of the metal materially reduces the danger of tube rupture and weakness, thereby resulting in a tube of substantially more valuable properties. Even should decarbonization of the surface occur the fact that the mandrel marks lie across the fiber of the metal substantially increases the strength of the tube, at least partially recompensing for the decarbonization of the surface.

The twisting operations, whereby the inequalities in wall thickness are directed helically along the wall of the tube, results in highly improved static and dynamic balance thereby enhancing the tube for use as a high speed propeller tube, by causing the line through the centers of gravity to lie in a helix about the axis of the outside circumference, instead of parallel with it as would otherwise be the case.

While I have thus described and illustrated one embodiment of my invention I am aware that numerous alterations and changes may be made therein without materially departing from the spirit of the invention and I do not wish to be limited except as required by the prior art and the scope of the appended claims.

I claim:

1. A propeller shaft comprising a seamless steel tube having the fiber of the metal helically directed in the walls thereof, the inequalities in wall thickness helically directed along the inner surface thereof, and the mandrel marks parallel with the longitudinal center thereof and at an angle with respect to said fiber whereby the balance and the strength of said shaft is substantially enhanced.

2. A propeller shaft comprising a seamless steel tube having the inequalities in wall thickness helically arranged along the inner surface of said tube to enhance the dynamic balance thereof and the mandrel marks lying at an angle with respect to the fiber of the metal to enhance the strength of the tube.

HORACE L. WAISNER.